United States Patent
Pollack et al.

(10) Patent No.: US 6,358,348 B1
(45) Date of Patent: Mar. 19, 2002

(54) METHOD OF WELDING GENERALLY ROD-SHAPED STRUCTURES OF A FLUORINE-CONTAINING PLASTIC MATERIAL IN A BUTT WELD

(75) Inventors: Jack Pollack, Monaco (MC); Robert Martin Hobson, Roque-Brune - Cap Martin; René Perratone, Menton, both of (FR)

(73) Assignee: Single Buoy Moorings Inc., Marly (CH)

( * ) Notice: Subject to any disclaimer, the term of this patent is extended or adjusted under 35 U.S.C. 154(b) by 0 days.

(21) Appl. No.: 09/381,338

(22) PCT Filed: Jan. 20, 1999

(86) PCT No.: PCT/EP99/00328

§ 371 Date: Oct. 7, 1999

§ 102(e) Date: Oct. 7, 1999

(87) PCT Pub. No.: WO99/37467

PCT Pub. Date: Jul. 29, 1999

(30) Foreign Application Priority Data

Jan. 20, 1998 (EP) ............................. 98200143
Jan. 20, 1998 (EP) ............................. 98200145
Mar. 24, 1998 (EP) ............................. 98200925

(51) Int. Cl.$^7$ ................ B32B 65/24; B32B 31/20; B29D 23/00

(52) U.S. Cl. ............ 156/158; 156/272.2; 156/304.2; 156/304.6; 156/308.2; 156/296

(58) Field of Search ................. 156/304.1, 304.2, 156/304.6, 296, 282, 311, 313, 158, 308.4; 285/272.1, 272

(56) References Cited

U.S. PATENT DOCUMENTS

| 3,207,644 A | 9/1965 | Hobson, Jr. et al. |
| 3,734,139 A | 5/1973 | Zafiroglu |
| 3,946,136 A | 3/1976 | Fitz et al. |

(List continued on next page.)

FOREIGN PATENT DOCUMENTS

| DE | 2 063 806 | 7/1972 |
| DE | 30 23 838 | 1/1982 |
| DE | 243 893 | 3/1987 |

(List continued on next page.)

*Primary Examiner*—Jeff H. Aftergut
*Assistant Examiner*—Todd J. Kilkenny
(74) *Attorney, Agent, or Firm*—Young & Thompson

(57) ABSTRACT

A method of butt welding two generally rod-shaped structures of a fluorine-containing plastic material includes the steps of placing end faces of the structures in a contacting relationship by supporting each structure in a clamping device, applying heat to the end parts of the structures that project from the clamping device, and pressing the end faces together by moving the clamping devices towards each other to apply a welding pressure of between 0.05 and 0.5 Nmm$^{-2}$ perpendicular to the end faces. The heating element surrounds the end parts along a substantially closed contour, and may comprise two segments which can be hinged into an open or closed position to be removed from the completed weld. The heating element may be energized in accordance with a predetermined heating profile, wherein the temperature of the weld area is measured and the heating operation of the heat generating member is increased or decreased to transmit and absorb heat from and into the heat reservoir member such that the temperature of the weld area is maintained within a predetermined margin around the heating profile.

20 Claims, 3 Drawing Sheets

U.S. PATENT DOCUMENTS

| | | |
|---|---|---|
| 3,976,534 A | 8/1976 | Walter et al. |
| 4,197,149 A | 4/1980 | Freitag et al. |
| 4,211,594 A | 7/1980 | Freitag et al. |
| 4,287,651 A | 9/1981 | Cilderman et al. |
| 4,438,323 A | 3/1984 | Milnes |
| 5,124,533 A * | 6/1992 | Dommer et al. ............ 219/243 |

FOREIGN PATENT DOCUMENTS

| | | | |
|---|---|---|---|
| EP | 0 167 870 | 1/1986 | |
| EP | 0 453 903 | 10/1991 | |
| FR | 1 207 226 | 2/1960 | |
| FR | 2 330 519 | 6/1977 | |
| GB | EP-0080729 A1 * | 6/1983 | .............. C08J/5/12 |
| GB | 2 240 980 | 8/1991 | |
| JP | 8-11217 | 1/1996 | |

* cited by examiner

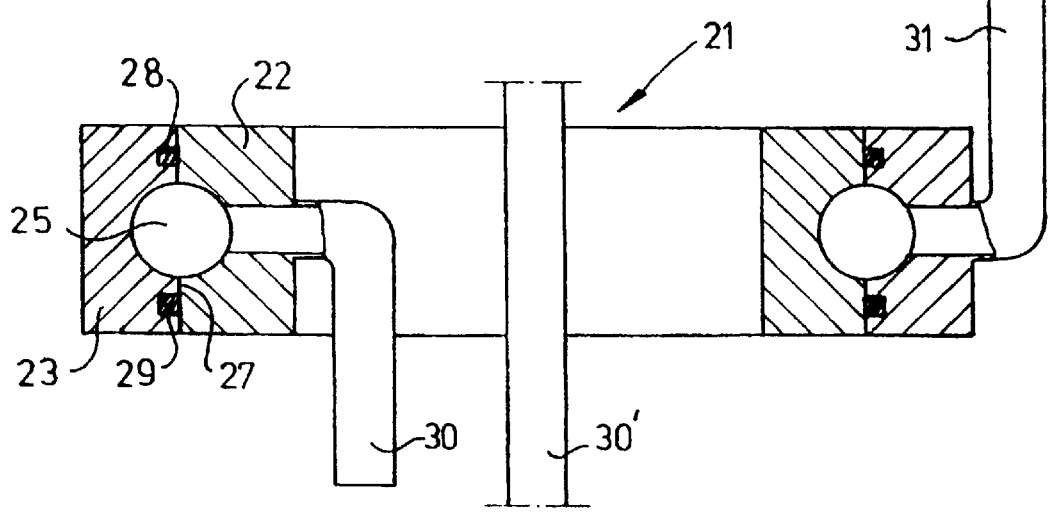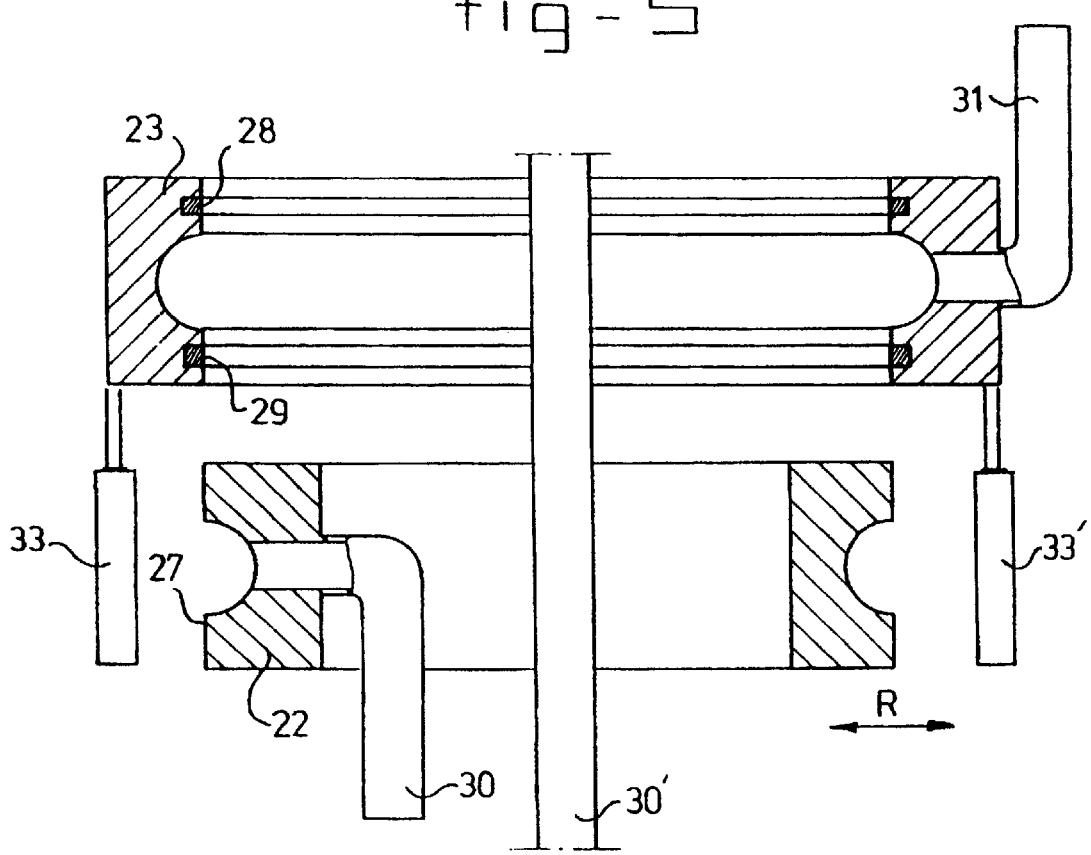

METHOD OF WELDING GENERALLY ROD-SHAPED STRUCTURES OF A FLUORINE-CONTAINING PLASTIC MATERIAL IN A BUTT WELD

BACKGROUND OF THE INVENTION

The invention relates to a method of welding two generally rod-shaped structures of a fluorine-containing plastic material in a butt weld comprising the steps of:
placing the end faces of the structures in a contacting relationship by supporting each structure in a clamping device at a distance from its end face, and
applying heat to the end parts of the structures that project from the clamping device, and
pressing the end faces together by moving the clamping devices towards each other such that a welding pressure of between 0.01 and 0.5 Nmm$^{-2}$, perpendicular to the end faces, is transmitted from the clamping devices to the end faces via the end parts of the structures, wherein the distance of the heating element from the end parts is sufficient to substantially prevent the heated parts of the structures from contacting the heating element.

The invention also relates to a method for replacing and repairing a sealing element of a swivel.

In the offshore technology, subsea hydrocarbon structures such as oil- or gas wells, are connected to floating production or processing vessels via one or more risers extending from the bottom of the sea to the vessel. The risers are connected to a piping structure on a turret around which the production vessel can weathervane to adjust its position according to prevailing wind and current directions. The geostationary parts of the product risers are connected to a stationary wall (for instance the inner wall) of respective swivel on the turret. The swivels are generally arranged in a swivel stack. Product piping for distributing the hydrocarbons to the weathervaning part of the vessel are connected to for instance the outer annular wall of the swivel which can rotate with the weathervaning vessel around the fixed-position inner wall. The rotating inner and outer walls are sealed by circular polytetrafluoroethylene (PTFE) sealing elements placed in a seal cavity and extending in the pressure extrusion gaps between the walls. The seal cavity may be formed in the inner swivel wall, the outer swivel wall, or both walls. The sealing element may be a piston type seal, a face type seal or a reinforcement ring and should be able to withstand pressures amounting up to 500 bar. The diameter of the seals may vary between for instance 20 cm and 3 m. In the extrusion gap, reinforcement rings may be placed against the seal, which are ring-shaped elements with a square cross-section, whereas the seal itself generally has a U- or V-shaped cross-section.

When a seal or reinforcement ring has to be replaced, the swivel stack needs to be dismantled. The inner and outer piping has to be detached from the inner and outer swivel walls and the non-functional swivel is radially taken out of the stack. Thereafter the inner and outer walls are separated, the sealing element is taken out and is replaced by a closed loop functional sealing element. Thereafter the annular walls are reassembled and the swivel is placed back in its swivel stack, whereafter the product piping is reconnected. This leads to a very long downtime and consequently high costs of the swivel seal repair. It is also known to add additional backup seals on a swivel stack upon installation for replacing a defective seal. By the use of extra backup seals already placed around the inner product piping, the non-functional seal can be changed out quickly in an emergency case without the need for removal of the inner piping and dismantling of the complete swivel stack. However, it is not possible to place additional backup seals around existing swivels in an easy manner.

From U.S. Pat. No. 3,946,136 it is known to connect two objects of polytetrafluoroethylene (PTFE) using an interlayer between two surfaces that are to be connected, the interlayer comprising between 90% and 99.5% by weight of tetrafluoroethylene and 0.5% to 10% by weight of perfluoroalkyl-perfluorovinyl. A process is described wherein the two PTFE-layers are placed in an overlapping relationship between horizontal plates and are heated up to a temperature of 400° C. while exerting a clamping pressure in the range of from 0,1 to 20 kilogram per cm$^2$ for a time of from 1 to 60 minutes.

From U.S. Pat. No. 4,211,594 a method is known for forming a butt joint between two abutting surfaces of structures formed of PTFE, According to this method, beating elements form a chamber around the butt seal wherein the heated end parts of the structures that are joined can expand and contact the heating element upon heating. In this way sufficient sealing pressure is provided on the end parts such as between 60 and 300 N per cm$^2$. Films of a fluorine-containing plastic material may be inserted into the gap between the abutting surfaces such as films of perfluoroalkoxypolymer (PFA). This method has as a disadvantage that distortions in the welded area are formed such that welds made according to this method are not acceptable, for instance for forming high pressure swivel seals of a fluorine containing thermoplastic material.

From U.S. Pat. No. 4,197,149 a method for forming a butt joint is known. According to this method, the heating element is spaced at a distance from the weld area. The clamping elements are provided with cooling channels for removal of heat from the weld area. With the known method, however, an accurate temperature control of the weld area is difficult. For some applications, such as for forming high pressure swivel seals, an accurate control of the temperature of the weld area is critical for obtaining a high quality weld.

SUMMARY OF THE INVENTION

It is an object of the present invention to provide a method of welding two generally rod-shaped structures of a fluorine-containing thermoplastic material in a butt weld by which the temperature of the weld area can be accurately controlled and which gives a strong seam with a smooth outer surface. It is a further object of the present invention to provide a method of welding two rod-shaped structures for forming a large diameter high pressure swivel seal. It is again another object of the present invention to provide a method of forming or repairing high pressure swivel seals which is relatively simple and which reduces down time upon repair.

Hereto the method according to the present invention is characterised in that the rod-shaped structures are welded to form a closed-loop structure, wherein the heating element surrounds the end parts along a substantially closed contour.

By using the end parts of the structures that are able to transmit the welding pressures due to their structural stiffness and shape-stability, it is not necessary to contact the sealing area with the heating element. In this way a very uniform and non-deformed butt weld can be produced. Because the heating element does not directly contact the end parts, a very uniform temperature distribution throughout the sealing volume can be achieved without degradation of the fluorine containing plastic material. Because the heating element substantially surrounds the end parts, a very accurate temperature control of all parts of the weld can be achieved, resulting in a very uniform, strong and reliable weld.

The heating element may be constructed upon welding from different separate parts which are connected to surround the closed-loop of fluorine-containing plastic material. After completion of the weld, the heating element may be disassembled. It is however preferred for quick operation, especially under offshore conditions, that the heating element is of a generally ring-shaped construction comprising two segments which are moved apart during placement and/or removal of the heating elements around the end parts, which segments are moved towards one another for carrying out the welding. The heating element can be quickly put in place by hinging the two segments apart along a flexible part thereof or alone a hingeline. After introduction of the end parts which are to be welded, the ring-segments of the heating element can be hinged together such that the heating element is closed such that a very uniform heating of the weld area can be obtained. After completion of welding the closed-loop construction, the heating element is opened and removed from the closed-loop construction.

In one embodiment, the heating element comprises a heat generating member and a heat reservoir member located in the vicinity of the weld area, wherein the heating element is energized in accordance with a predetermined heating profile, wherein the temperature of the weld area is measured and the heating operation of the heat generating member is increased or decreased to transmit and absorb heat from and into the heat reservoir member such that the temperature of the weld area is maintained within a predetermined margin around the heating profile.

By providing a heat reservoir member, which may for instance be formed by a ring-shaped metal body having a large heat capacity, heat can be applied to and removed directly from the weld area, without having to be conducted through the clamping members such as in U.S. Pat. No. 4,197,149. By accurately monitoring the temperature of the weld area and by adding or removing heat from the weld area by means of the temperature reservoir member, a very accurate temperature control is possible such that a desired temperature profile, which may include a heating up phase, a stabilisation phase and a cooling down phase, may be followed within 1° C.

As used herein, the term "rod-shaped" is intended to mean end parts of a generally cylindrical, square, polygonal or any other cross-sectional shape in contrast to a generally two-dimensional sheet material. The fluorine containing thermoplastic material may comprise PTFE, PFA (which is considered as PTFE material with approximately 5 weight % PFA) or modified PTFE (which is considered as PTFE with less than 1% PFA) or any other fluorine containing thermoplastic material.

Preferably the heating element heats the end parts to a temperature between 300° C. and 400° C., preferably between 360° C and 390° C. The heating element surrounds the end parts along a substantially closed contour and can be formed of for instance an electrical resistance heater such as available from Exotherm Products LTD, South Glamorgan, UK. The distance between the heating element and the end parts may be between 0.5 mm and 10 mm.

In one embodiment of the method according to the present invention a welding material, such as for instance a PFA-material, is placed between the end faces prior to pressing the end faces together. Hereby the sealing temperatures and sealing pressures may be reduced and sealing may be achieved in for example 20 minutes. The welding material may comprise a film of a thickness between 0.01 mm and 1 mm. The use of a film allows for a small amount of surface misalignment and roughness to be tolerated during the welding process.

In one preferred embodiment of the method according to the present invention, the structures are formed by the end parts of a ring of uniform cross-section which may be a sealing ring or reinforcement ring for high pressure swivels having a diameter of between about 0.2 m and 3 m and a cross-sectional area of between about 1 $cm^2$ and 4 $cm^2$. Such sealing elements are used under pressures ranging from 50 to 500 bar and temperatures of up to 90° C. The high pressure swivels of which the seals are part, comprise inner and outer annular walls which are rotatingly connected to each other for passing hydrocarbons from the inner part of the stationary inner wall to the rotating outer piping of the outer walls. Multiple swivels may be axially aligned in a swivel stack configuration. When a seal needs to be replaced upon failure, the swivel stack has to be disassembled and the swivel with the non-functional seal is completely removed after disconnecting and removing of the inner and outer piping. This results in a long period of shut down of the production process. The seal replacement or repair method according to the present invention is characterised in that the functional sealing element is in the form of an open loop of fluorine containing material, and is placed on the swivel either prior to or after removal of the non-functional sealing element by sealing the end parts in a butt weld to form a closed loop by the steps of:

placing each end part of the sealing element in a respective clamping device at a distance from an end face of each end part, pressing the end faces together by moving the clamping devices towards each other such that a welding pressure perpendicular to the end faces is transmitted from the clamping devices to the end faces via the end parts of the sealing element, and heating the end faces by a heating element while maintaining the heating element at a sufficient distance from the end parts to substantially prevent the heated end parts of the sealing element from contacting the heating element, wherein the heating element surrounds the end parts along a substantially closed contour.

According to the present invention, a swivel with a damaged or non-functional seal no longer needs to be removed from the swivel stack. The sealing element according to the present invention can be exchanged while the inner and outer walls of the swivel are taken apart wherein the outer ends of the sealing element are sealed after putting the seal in its proper position by placing it in a radial direction around the inner annular wall, including the inner piping which remains attached during repair. This considerably reduces the down time upon swivel repair.

BRIEF DESCRIPTION OF THE DRAWINGS

The invention will be described in detail with reference to the accompanying drawings. Although the invention is specifically described in the context of welding the end parts of a swivel sealing element, the invention is not limited hereto and can be applied to other structures of fluorine-containing plastic materials.

In the drawings:

FIGS. 4 and 5 show a schematic axial cross-sectional view of a swivel in its assembled and disassembled state, respectively.

DESCRIPTION OF THE PREFERRED EMBODIMENTS

Figure 1:
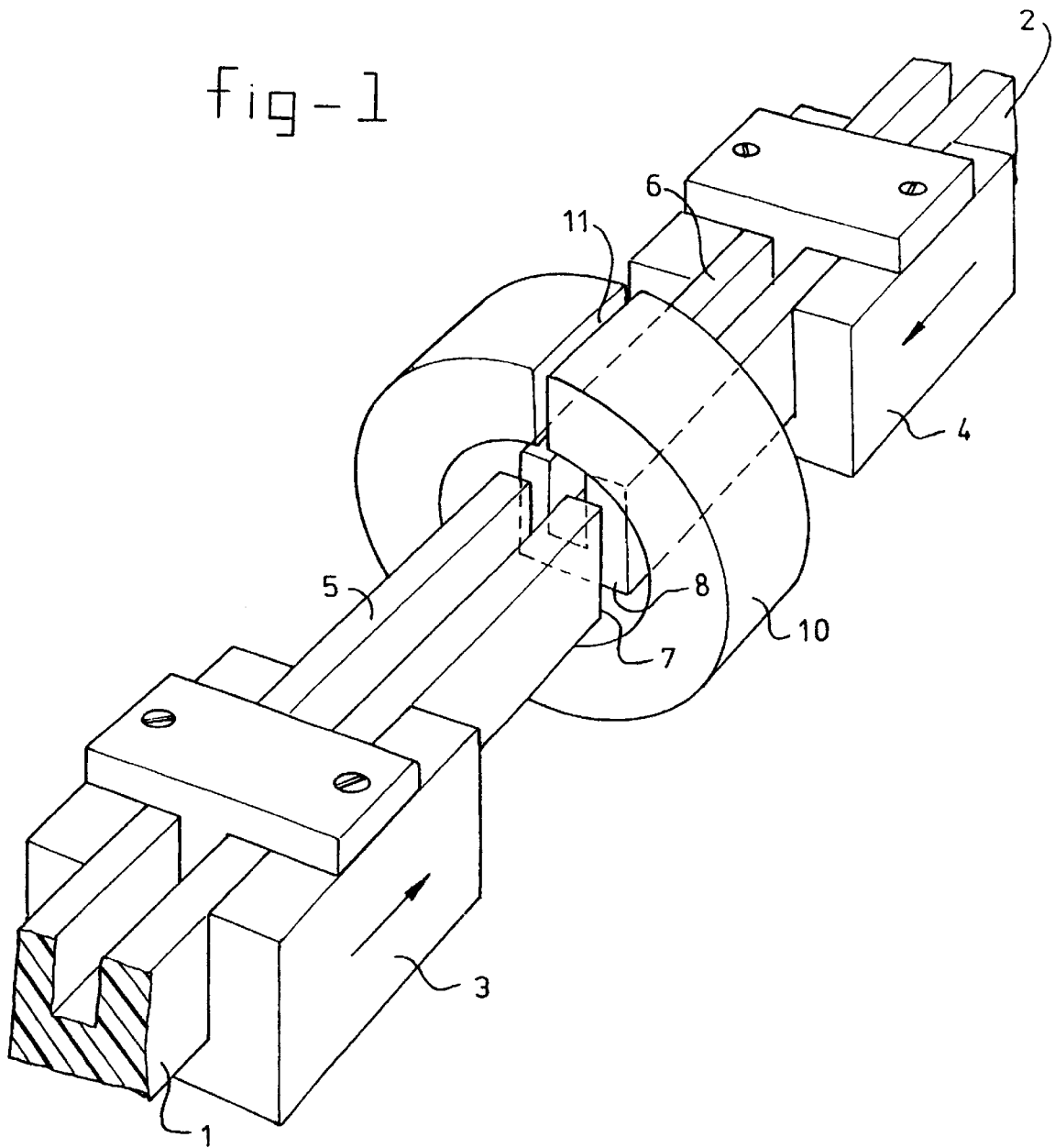
FIG. 1 shows a schematic perspective view of the device for carrying out the method according to the present invention.

FIG. 1 shows two PTFE-structures 1,2 such as the ends of a sealing element of a high-pressure swivel, that are clamped in two clamping devices 3,4. The end parts 5,6 are pressed together in the direction of the arrows by the clamping devices 3,4. The end faces 7,8 of the end parts 5,6 are pressed together at a pressure of less than about 0.5 N/mm$^2$, for instance at a pressure of 0.15 N/mm$^2$. One or both of the clamping devices 3,4 is displaced by a pneumatic actuator. Such a pneumatic actuator allows for the application of relatively low compression forces between the clamping devices 3,4 which low forces can be accurately controlled. A welding material in the form of PFA-film is placed between the end faces 7 and 8. A heating element 10 of ring-shaped or tubular form surrounds the end parts 5,6 at a distance from the end parts 5,6. Heat is transferred by radiation or convection from the heating element 10 to the end parts 5 and 6 which are heated to temperatures of up to about 350° C. As can be seen in FIG. 1, the heating element 10 is of uniform cross-sectional shape, surrounding the end parts 5,6. The distance between the heating element 10 and the end parts 5,6 amounts to between 0.5 mm and 10 mm. The heating element 10 incorporates a ring-shaped electrical resistance heater which has an output of 200 Watts or more. The body of the ring-shaped heater 10 may be made of a flexible construction which can be bent open along the split 11. It is also possible that the heater 10 is made of a stiff material which can be hinged open around a hinge point located opposite the split 11.

Figure 2:
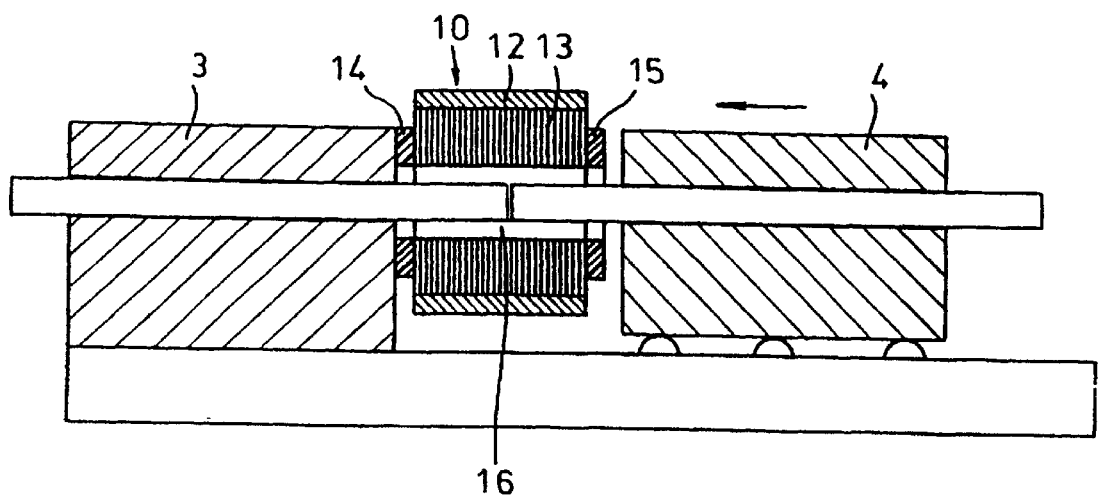
FIG. 2 shows a schematic cross-sectional view of a sealing device having a heating element according to the present invention.

As can be seen in FIG. 2, the heating element 10 comprises a heat generating member 12 surrounding a ring shaped heat reservoir member 13. The heat generating member 12 may comprise a band heater, or other electrical heating elements. The heat reservoir member 13 may comprise a metal ring shaped body with a relatively large heat capacity. The heat reservoir member 13 is connected to the clamping device 3 via a heat insulating connection 14, which may be comprised of a heat resistant material such as a ceramic material. A second insulating ring 15 is applied to the other side of the heat reservoir member 13 which faces the clamping device 4. In this manner heat loss to the clamping devices 3 and 4 is prevented. Upon activating the electrical heat generating member 12, heat will be supplied via the heat reservoir member 13 directly to the weld area 16. When the energy supply to the heat generating member 12 is switched off, heat will be removed from the weld area 16 to the heat reservoir member 13. In this manner the temperature of the weld area 16 can be very accurately controlled which results in very strong seals being formed. After formation of the weld, the heating element 10 and the clamps 3 and 4 can be opened and removed from the PTFE-material.

Figure 3:
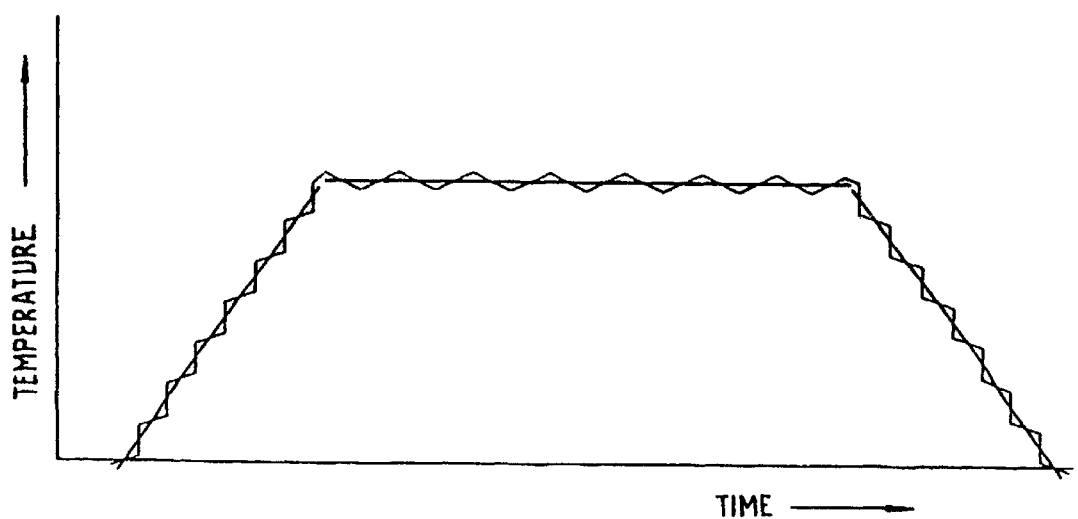
FIG. 3 shows a temperature profile applied during the welding process of the present invention.

FIG. 3 shows a temperature profile which is applied during welding according to the present invention. During the first heating phase, the temperature of the weld area 16 as shown in FIG. 2 is increased from room temperature to about 375° C. Thereafter a period of substantially constant high temperature is maintained in the weld area followed by a gradual decrease back to room temperature. During the beating up phase, the stabilisation phase and the cooling down phase the temperature of the weld area is closely monitored, for instance by a temperature sensor attached to the heat reservoir member 13 or a temperature sensor located in the weld area 16. As soon as the temperature in the weld area deviates plus or minus 1° C. from the temperature curve which has to be followed, the heat generating member 12 is switched off or activated to maintain the temperature of the weld area within 1° C. of the profile.

FIG. 4 shows a high pressure swivel 21 comprising an inner annular wall 22 and an outer annular wall 23. The inner and outer walls 22 and 23 can rotate with respect to each other and define an annular chamber 25 therebetween. Between the walls 22 and 23 an extrusion gap 27 is formed. The outer wall 23 comprises two seal cavities in which two ring-shaped sealing elements 28 and 29, made of PTFE-material are located. The sealing elements 28 and 29 in this example comprise so-called piston-type seals, but the present invention is not limited thereto.

Risers 30,30' extend from a subsea structure to the fixed inner walls of the swivels. Product piping 31 extends from the rotating outer wall, or ring 23 to other parts of the vessel.

When a seal 28,29 according to the present invention is damaged, the product piping 31 is disconnected and the outer ring 23 is lifted for instance by means of a hydraulic jack 33. The product riser 30 remains attached to the inner wall 22. The riser 30' also remains attached to its swivel (which is not shown in the drawings). Thereafter the non-functional seal 28 or 29 is cut open so that the closed loop can be opened and the seal can be removed from the inner ring 22 in a radial direction indicated by arrow R. Thereafter a new sealing element, which comprises an open-loop PTFE seal can be placed back around the inner wall 22 again in the radial direction R, together with the clamping/heating devices under or above the open inner or outer swivel ring or in the open fluid chamber 25 of the inner or outer ring, where there is some clearance for the clamping/heating device. After completing the welding process, the clamping/heating device can be split and removed from the welded seal and the welded seal can be placed back into the seal cavity.

What is claimed is:

1. A method of butt welding two rod-shaped structures, comprising the steps of:
    placing end faces of the two structures in contact with each other in a weld area by supporting each structure in a clamp at a distance from the respective end face;
    heating a heat reservoir with heat from a heat generator that is in heat-conducting contact with the heat reservoir, heat from the heat reservoir heating the weld area, the heat reservoir substantially surrounding the weld area between the heat generator and the structures and being spaced from heated parts of the structures; and
    pressing the end faces together by moving at least one clamp towards the other clamp to apply a welding pressure perpendicular to the end faces.

2. The method of claim 1, further comprising the steps of measuring a temperature of the weld area, and adjusting the heat provided to the heat reservoir so that the temperature of the weld area follows a temperature profile.

3. The method of claim 1, wherein the heat reservoir is metal.

4. A method of welding two generally rod-shaped structures of a fluorine-containing plastic material in a butt weld to form a closed-loop structure, the method comprising the steps of:

placing the end faces of the structures in a contacting relationship in a weld area by supporting each structure in a clamping device at a distance from its end face;

applying heat to a heat reservoir in heat-conducting contact with a generator of the heat, the heat reservoir substantially surrounding and heating end parts of the structures that project from the clamping device, the heat reservoir being spaced from the end parts;

pressing the end faces together by moving the clamping devices towards each other such that a welding pressure of between 0.01 and 0.5 $Nmm^{-2}$, perpendicular to the end faces, is transmitted from the clamping devices to the end faces via the end parts of the structures, wherein the distance of the heat reservoir from the end parts is sufficient to substantially prevent the heated parts of the structures from contacting the heat reservoir;

measuring a temperature of the weld area; and adjusting the heat applied to the heat reservoir so that the temperature of the weld area is maintained within a predetermined margin of a predetermined temperature profile.

5. The method according to claim 1, wherein the heat reservoir is ring-shaped and comprises two segments, and wherein the method further comprises the step of moving the two segments apart during placement and removal of the heat reservoir around the end parts.

6. The method according to claim 1, wherein the heat reservoir heats the end parts to a temperature between 360° C. and 390° C.

7. The method according to claim 1, wherein the distance of the heat reservoir from the end parts is between 0.5 mm and 5 mm.

8. The method according to claim 1, further comprising the step of inserting a welding material between the end faces prior to pressing the end faces together.

9. The method according to claim 8, wherein the welding material comprises a fluorine containing thermoplastic material.

10. The method according to claim 8, wherein the welding material comprises a film of a thickness between 00.1 mm and 1 mm.

11. The method according to claim 1, wherein the end parts comprise at least 50% modified PTFE.

12. The method according to claim 1, wherein the end parts comprise PTFE.

13. The method according to claim 1, wherein the end parts of the structures have an unsupported length of at least 0.5 cm.

14. The method according to claim 1, wherein the structures form ends of a ring of uniform cross section.

15. The method according to claim 1, wherein the structures form ends of a sealing ring for a high-pressure swivel.

16. The method according to claim 1, wherein the structures form a back-up ring for a high-pressure swivel.

17. The method according to claim 1, wherein the temperature profile comprises a heat up phase of uniformly increasing temperature, a stabilisation phase for substantially constant temperature and a cooling phase of uniformly decreasing temperature.

18. The method of claim 1, wherein the heat reservoir is metal.

19. A method of replacing or repairing a first sealing element of a swivel having an inner and an outer annular wall which define an annular chamber therebetween, the first sealing element being located between the inner and outer walls and comprising a closed loop of a fluorine containing plastic material, the method comprising the steps of displacing the inner or the outer annular wall in an axial direction with respect to its adjacent wall;

removing the first sealing element from the swivel by opening the loop of the first sealing element, and replacing the first sealing element with a second sealing element, the second sealing element being an open loop of fluorine containing material that is placed on the swivel either prior to or after removal of the first sealing element by sealing end parts of the second sealing element in a butt weld to form a closed loop by the steps of;

placing each of the end parts of the second sealing element in a respective clamping device at a distance from an end face of each end part, pressing the end faces together in a weld area by moving the clamping devices towards each other such that a welding pressure perpendicular to the end faces is transmitted from the clamping devices to the end faces via the end parts, and heating a heat reservoir with heat from a heat generator that is in heat-conducting contact with the heat reservoir, the heat reservoir substantially surrounding and heating the end parts, the heat reservoir being spaced from the end parts, measuring a temperature of the weld area;

adjusting the heat applied to the heat reservoir so that the temperature of the weld area is maintained within a predetermined margin of a predetermined temperature profile.

20. The method according to claim 19, wherein the heat reservoir is ring-shaped and comprises two segments, and wherein the method further comprises the step of moving the two segments apart during placement and removal of the heat reservoir around the end parts.

* * * * *